(12) United States Patent
Le Bars et al.

(10) Patent No.: US 11,006,137 B2
(45) Date of Patent: May 11, 2021

(54) SCHEDULER OF PROCESSES HAVING TIMED PREDICTIONS OF COMPUTING LOADS

(71) Applicant: Harmonic, Inc., San Jose, CA (US)

(72) Inventors: Eric Le Bars, Geveze (FR); Arnaud Mahe, Poligne (FR); Christophe Berthelot, Erce Pres Liffre (FR)

(73) Assignee: Harmonic, Inc., San Jose, CA (US)

( * ) Notice: Subject to any disclaimer, the term of this patent is extended or adjusted under 35 U.S.C. 154(b) by 174 days.

(21) Appl. No.: 16/284,881

(22) Filed: Feb. 25, 2019

(65) Prior Publication Data

US 2019/0222857 A1    Jul. 18, 2019

Related U.S. Application Data

(63) Continuation of application No. 15/391,717, filed on Dec. 27, 2016, now Pat. No. 10,216,541.

(30) Foreign Application Priority Data

Dec. 29, 2015 (EP) ..................................... 15307162

(51) Int. Cl.
*G06F 9/46* (2006.01)
*H04N 19/426* (2014.01)
(Continued)

(52) U.S. Cl.
CPC ........... *H04N 19/426* (2014.11); *G06F 9/505* (2013.01); *G06F 9/5077* (2013.01); *G06F 2209/5019* (2013.01); *H04N 19/40* (2014.11)

(58) Field of Classification Search
CPC ............................ H04N 19/426; G06F 9/5077
See application file for complete search history.

(56) References Cited

U.S. PATENT DOCUMENTS 5,917,475 A * 6/1999 Kuzunuki ............. G06F 3/0481
                                                    345/173
8,271,757 B1    9/2012 Chatterjee
(Continued)

FOREIGN PATENT DOCUMENTS

WO    2014/032463 A1    3/2014

OTHER PUBLICATIONS

European Search Report issued in corresponding European Patent Application No. 15307162.6, dated Mar. 14, 2016.
(Continued)

*Primary Examiner* — Camquy Truong
(74) *Attorney, Agent, or Firm* — Brokaw Patent Law PC; Christopher J. Brokaw (57) ABSTRACT

A scheduler of computer processes. The scheduler obtains predictions of a computing load of at least one multimedia process comprising real time video encoding or transcoding of a video in real time, including predictions of a target index of video quality to deliver the video over a period of time. Predictions of available computing capacities of a cluster are also retrieved. A determination is made, based on the predictions of the computing load and the predictions of the available computing capacities, of a processing capability to allocate the at least one multimedia process during the period of time. At least one virtual environment is created for the at least one multimedia process. The computing capacity of the at least one virtual environment is adapted to the predictions of the computing load of the at least one multimedia process during the period of time.

42 Claims, 7 Drawing Sheets

(51) Int. Cl.
    *G06F 9/50*        (2006.01)
    *H04N 19/40*      (2014.01)

(56) References Cited

U.S. PATENT DOCUMENTS

| | | | |
|---|---|---|---|
| 8,677,353 | B2 | 3/2014 | Machida |
| 9,860,569 | B1* | 1/2018 | Wilms ............. H04N 21/23418 |
| 2005/0108712 | A1 | 5/2005 | Goyal |
| 2005/0144280 | A1 | 6/2005 | Kawai |
| 2012/0137002 | A1 | 5/2012 | Ferris |
| 2012/0193984 | A1 | 8/2012 | Krok |
| 2013/0174146 | A1 | 7/2013 | Dasgupta et al. |
| 2017/0104627 | A1* | 4/2017 | Bender ................. H04L 47/765 |

OTHER PUBLICATIONS

Sanjay Kumar, et al., "vManage: Loosely Coupled Platform and Virtualization Management in Data Centers," Proceedings of the 6th International Conference on Autonomic Computing '09, Barcelona, Spain, Jun. 15, 2009, p. 127.

Zhenhuan Gong et al, "Press: PRedictive Elastic ReSource Scaling for Cloud Systems," Network and Service Conference on, IEEE, Piscataway, NJ, USA, Oct. 25, 2010, pp. 9-16.

Hao Lin et al., "Workload-Driven VM Consolidation in Cloud Data Centers," 2015 IEEE International Parallel and Distributed Processing Symposium, May 25, 2015, pp. 207-216.

\* cited by examiner

SCHEDULER OF PROCESSES HAVING TIMED PREDICTIONS OF COMPUTING LOADS

CLAIM OF PRIORITY

This application is a continuation patent application of U.S. Pat. No. 10,216,541, issued on Feb. 26, 2019, entitled 'Scheduler of Processes Having Timed Predictions of Computing Loads, invented by Eric Le Bars et. al., the entire disclosure of which is hereby incorporated by reference in its entirety for all purposes as if fully set forth herein.

This patent application, as well as parent U.S. Pat. No. 10,216,541, claims priority to European Patent Application Serial No. 15307162.6, filed on Dec. 29, 2015, entitled "Scheduler of Processes Having Timed Predictions of Computing Loads," invented by Eric Le Bars et. al., the entire disclosure of which is hereby incorporated by reference in its entirety for all purposes as if fully set forth herein.

FIELD OF THE INVENTION

Embodiments of the invention relate to the repartition of processes amongst virtual and physical machines.

BACKGROUND

In computing, a virtual machine (VM) is an emulation of a particular computer system. Virtual machines may operate based on the computer architecture and functions of a real or hypothetical computer. Implementing a virtual machine may involve specialized hardware, software, or both.

Virtual machines may be classified based on the extent to which they implement functionalities of targeted real machines. System virtual machines (also known as full virtualization VMs) provide a complete substitute for the targeted real machine and a level of functionality required for the execution of a complete operating system. In contrast, process virtual machines are designed to execute a single computer program by providing an abstracted and platform-independent program execution environment.

The use of VMs provides flexibility in the handling of tasks to execute in parallel. VMs can be created and deleted easily to meet the needs of task processing that evolve in real time. In multimedia processing, VMs provide flexibility for creating machines with desired properties, since the actual characteristics of a VM are a combination of software characteristics and characteristics of the physical machine on which the VM is executed.

In a multimedia head-end server, a plurality of machines, whether they be physical or virtual, are usually available. When a plurality of processes is to be executed on a plurality of machines, an orchestrator may be used to dispatch the execution of the processes amongst the machines.

When an orchestrator creates a VM in which a process is to be executed, the orchestrator usually creates a VM with computing resources just sufficient to execute the process. A VM obtains all its resources from the physical machine on which it is executed, even if these resources are unused by the processes running on the VM. Thus, creating a VM with computing resources allocated to the virtual machine is excess of the requirements of the computing load of the virtual machine wastes resources of the physical machine.

The computing load of multimedia processes, and particularly video processing processes, can vary. Live video transcoding can be performed in real time according to different options. Video encoding can be performed with different options and different complexities. PCT Patent Application No. PCT/EP2014/055823, filed by the Applicant, discloses the allocation of a level of quality to different video coders, and the activation of different video coding tools and options according to the level of quality to deliver in real time. It is possible, with such encoding systems, to obtain in real time, at the same bitrate, a video of better quality when allocating more computing resources to video coding.

In the video broadcast industry, the desired quality with which the same video channel is delivered may vary over time. For example, one may wish to obtain a better quality/size ratio for prime time programs. It is possible to obtain this result by first creating a VM for encoding of a TV channel live, then increasing the computing resources allocated to the VM to encode prime time or premium programs. It is possible to decrease the resources allocated to the VM afterwards, when the TV channels switches to non-prime time or non-premium programs. It is possible to predict a profile of computing resources to allocate to each VM at different times. However, this can be problematic when the computing load of a video encoding process running on the VM increases, as the computing resources of the VM may become insufficient to run processes in real time.

One solution to overcome this issue involves transferring the execution of the process to another machine. However, when the output of the process has to be delivered in real time, for example if the process relates to video encoding for streaming, transferring the execution of the process to another machine would result in a rupture of service, which is not acceptable.

If the machine on which the process is executed is a VM, another solution consists of increasing the resources of the VM, so that they become sufficient for performing the process properly. This can be achieved for example by increasing the CPU allocation or memory available on the VM. However this solution is not applicable to the physical machine. Moreover, it also brings uncertainty for VMs. Indeed, the resources of VMs rely on the resources of the physical machine on which they are executed. Thus, if the resources of the physical machine on which a VM is executed are already reserved, for example by other VMs, it is not possible to increase the resources available for a VM using those resources.

European patent application EP 15306393.8, filed Sep. 11, 2015 by the Applicant, discloses a scheduler of computer processes which is able to dispatch computer processes amongst different VMs, allocate VMs on a cluster of physical machines, and modify the resources of VMs so as to adapt to the variations of computing loads of the computer processes. This scheduler permits a fully adaptive management of virtual machines. However, it does not take into account, when allocating VMs on physical machines, the future variations of the computing resources of VMs. It is therefore possible, in extreme cases, that this prior art scheduler transfers the execution of a process to another VM, or transfers a VM to another physical machine. Even if they are rare, such a scheduler may occasionally generate ruptures of service.

There is therefore a need for a scheduler of computer processes in a cluster of physical machines, which is able, when the computer load of computer processes are predictable, to optimize, from the creation of computer processes, the dispatch of processes in the cluster of physical machines, and ensure, at any time, that the computer processes will be able to run in real time, without the need for process relocation.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for scheduling of video coding processes amongst a set of VMs are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

In this specification, embodiments of the invention shall be described by way of examples relative to the scheduling of video coding processes amongst one or more VMs. The term coding process is used to generally refer to either an encoding or a transcoding process. However, embodiments of the invention are not restricted to the specific examples discussed herein, as other embodiments may encompass any existing or future Operating-System-Level virtual environment. For example, embodiments of the invention are also applicable to Linux containers and other types of containers. Embodiments of the invention are also well suitable to other types of multimedia processes performed in real time, such as audio encoding or transcoding. Similarly, embodiments of the invention are applicable to any computer process whose computing load can be predicted over a period of time. Embodiments are also applicable to the dispatch of Operating-System-Level virtual environments amongst different processors of a same physical machine or different cores of a same processor.

Functional Overview

Embodiments of the invention are directed towards a scheduler of computer processes to be run on a cluster of processing capabilities. The scheduler may obtain predictions of a computing load of at least one computer process to allocate, where the predictions are associated with a period of time. Thereafter, the scheduler may retrieve predictions of available computing capacities of the processing capabilities for the period of time and determine, based on those predictions, a processing capability where to allocate at least one computer process during the period of time. At least one Operating-System-Level virtual environment may be created for the at least one computer program. The at least one Operating-System-Level virtual environment may have a computing capacity equal to or higher than a prediction of the computing load of the at least one computer process to allocate at a start of the period of time. Thereafter, the computing capacity of the at least one Operating-System-Level virtual environment may be adapted to the predictions of the computing load of the at least one computer process during the period of time.

Advantageously, embodiments enable a scheduler to ensure that a computer process will be able to run in real time on a single virtual machine regardless of the variations of computing load of the process, without transferring the computer process to another virtual machine, and without transferring the virtual machine to another physical machine, as soon as the variations of computing load of the process are predictable.

Embodiments specifically allow for a scheduler of live video encoding or transcoding to ensure that a video stream can always be obtained in real time at the desired quality, without rupture of service. A scheduler of computer processes of an embodiment may optimize the repartition of computer processes in a cluster of physical machine. As a result, embodiments enable a reduction of the number of physical machines required, a reduction in electricity consumption, and a reduction of the size of data centers. In the particular case of Playout for Channel Origination, embodiments may take advantage of the scheduler of processes when the scheduler is also in charge of the scheduling of video assets. In this case, the scheduler has access to a multitude of editorial data, and by collecting the computing load for the asset videos being encoded or transcoded, the computing load for these asset videos may be stored in addition to the metadata of description of the asset videos. Thanks to the collection of this measured information, embodiments may employ a scheduler that uses this collected information to determine the computing capacity for the asset videos in the future. By extension, the scheduler of an embodiment may accurately estimate after learning about several assets of the same type, according to their editorial data (such as cartoon, an action movie, a weather report, a soccer game, resolution, year of production, and so on), the minimum computing capacity for this type of content.

Architecture Overview

Figure 1:
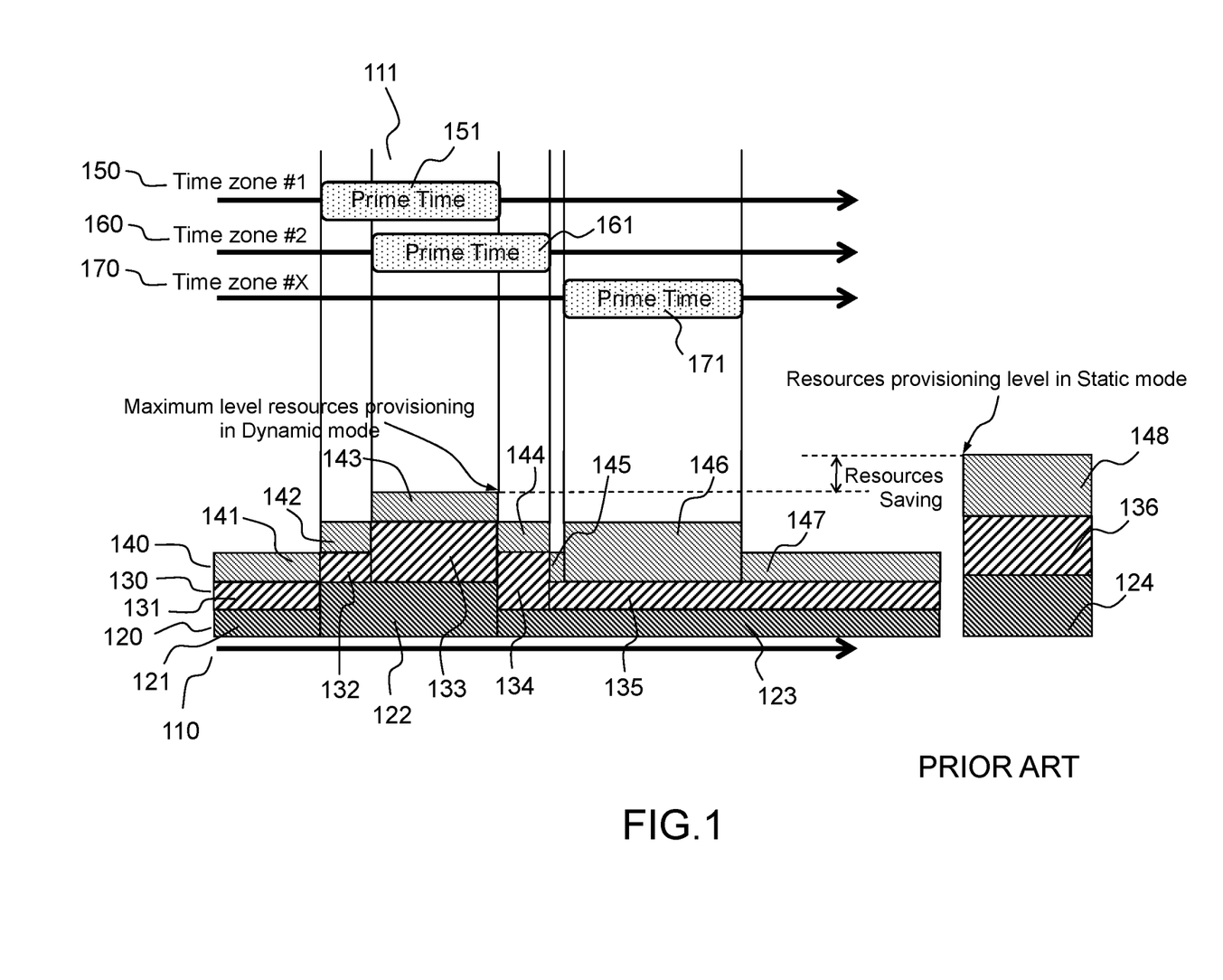
FIG. 1 displays the evolution of computing capacity required to encode or transcode in real time video content for 3 TV channels, according to variations of a target quality for the 3 channels, in the prior art.

FIG. 1 displays the evolution of computing capacity required to encode or transcode in real time video content for 3 TV channels, according to variations of a target quality for the 3 channels in accordance with the prior art. FIG. 1 represents, over an axis of time 110, a first evolution 120 of a first computing capacity to encode in real time a first program, a second evolution 130 of a second computing capacity to encode in real time a second program, and a third evolution 140 of a third computing capacity to encode in real time a third program. The heights of the rectangles represent, for each program, the required computing capacities at each time.

The first program is to be broadcast in a first time zone 150, the second program in a second time zone 160, and the third program in a third time zone 170. Due to the differences of time zones, the prime times from the three time zones are different: the first time zone 150 has a first prime time period 151, the second time zone 160 has a second prime time period 161, and the third time zone 170 has a third prime time period 171. In prime time periods, it is desirable to have a better video quality for the channels carrying prime time programs. It may be desirable to have a better quality in other circumstances, for example when broadcasting popular movies or TV shows or for important sporting events.

Due to the relationship between the computing capacities of VMs and the quality of live video coding discussed above, it is possible to adapt the video quality to prime time period/popular TV shows for the different channels by adjusting the computing capacities of live encoders of the corresponding video streams.

In the example of FIG. 1, the first computing capacity would be high 122 during the first prime time period 151 and low 121, 123 at other moments. Similarly, the second computing capacity 130 would be high 133, 134 during the second prime time period 161, and low 131, 132, 135 otherwise. Similarly, the third computing capacity would be high 146 during the third prime time period 171, and low 141, 142, 143, 144, 145, 147 otherwise.

Thus, the sum of the processing capacities to encode the videos for the 3 channels varies and is, in this example, highest in the time period 111 which is common to the first prime time period 151 and the second prime time period 161.

When coding processes are performed within the VMs, it is possible to adjust to these changes by modifying the computing capacities of the VMs, and by extension the computing resources reserved by each VM on a physical machine. However, due to the changes of computing capacities, a problem may occur if the three VMs are allocated in the same physical machine when their three computing capacities are low, for example before the first prime time period. Indeed, the sum of their processing capacities can be, at the time of deployment, lower than the computing resources of the physical machine, but exceed them when the computing capacities of the VMS are increased for prime time periods, for example in the period 111. In this case, the VMs would not have enough computing capacities to execute the coding tasks as excepted.

One solution employed by the prior art to overcome this issue is to calculate the sum of the maximum computing capacities of each VM, for example the sum of the maximum computing capacities 148, 136 and 124, and allocate only these three VMs on a physical machine having a processing resources equal to the sum of the maximum computing capacities 148, 136 and 124. Doing so ensures that the computing resources of the physical machine will, at any time, be lower than the sum of computing capacities of all VMs, and that it will be, at any time, possible to broadcast programs for the three channels at the expected quality at any time.

However, this solution has a major drawback: most of the time, if not always, the sum of processing capacities of the VMs is lower than the sum of maximum processing capacities. Thus, this leads to an important waste of resources on the physical machine. This same issue may also arise for any process whose computing load varies but is predictable.

Figure 2:
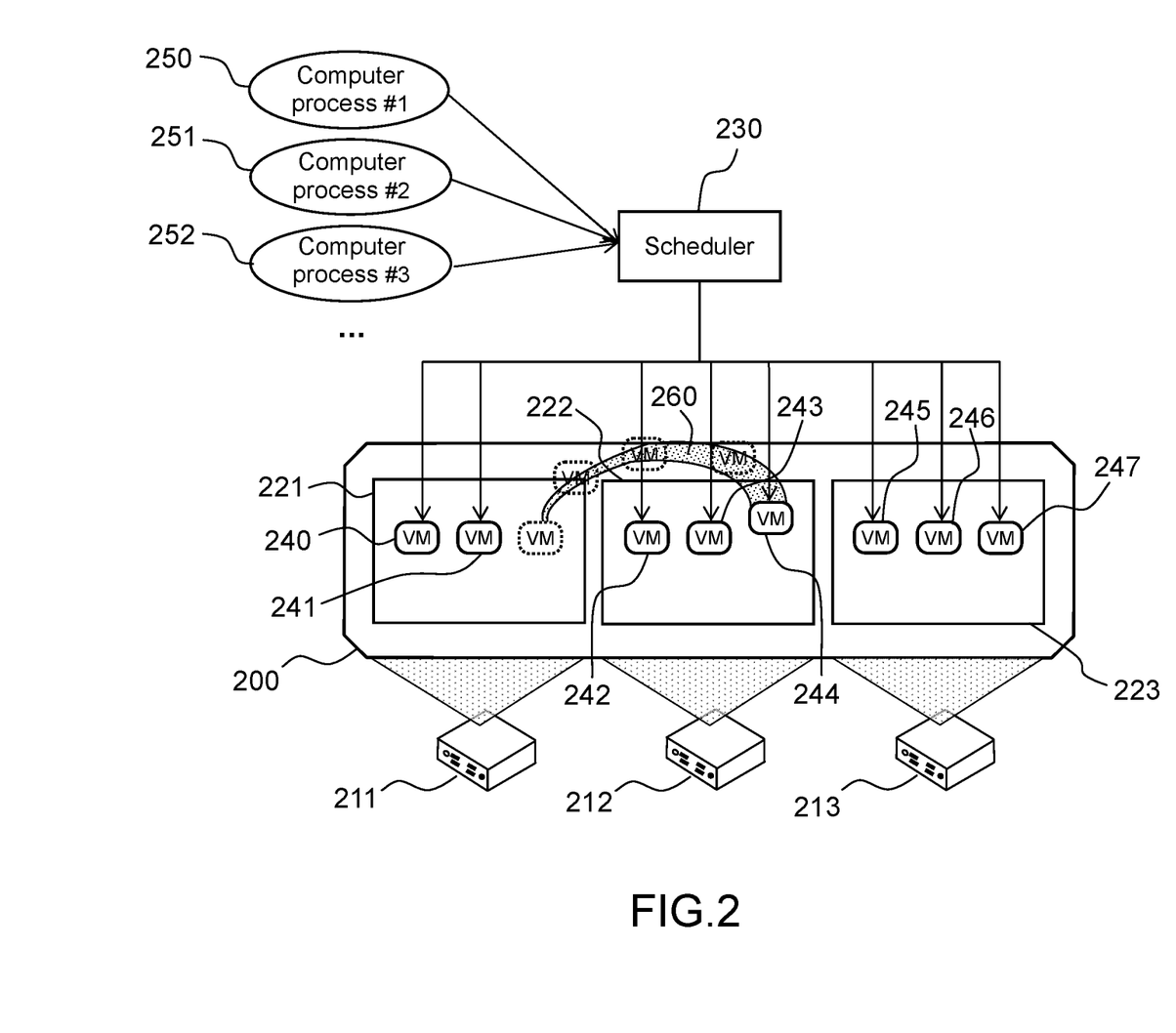
FIG. 2 displays a general overview of a cluster of physical machines and a scheduler of computer processes in accordance with an embodiment of the invention.

FIG. 2 displays a general overview of a cluster 200 of physical machines and a scheduler of video processes in accordance with an embodiment of the invention. Cluster 200 comprises three physical machines 211, 212 and 213. Each physical machine 211, 212, 213 is associated with a particular host of VMs, respectively the hosts 221, 222, and 223. A host of VMs is responsible for reserving a portion of resources of physical machines and executing the VMs on the reserved resources.

Scheduler 230 is configured to create and allocate VMs to execute one or more computer processes 250, 251 and 252. Scheduler 230 is responsible for balancing computing loads amongst the VMs. Scheduler 230 may create a plurality of processes comprising video coding processes, create VMs to execute these processes, dispatch the VMs on the physical machines, and modify the computing capacities of the VMs. In the example of FIG. 2, scheduler 230 created 8 VMs 240, 241, 242, 243, 244, 245, 246, and 247.

When a VM is allocated on a physical machine, a part of the resources of the physical machine are reserved for the VM. Such reserved resources include, for example, a reservation of CPU, a reservation of RAM, and a reservation of network bandwidth. The sum of resources reserved for the VMs running on the same physical machine cannot exceed the resources of the physical machine on which they run. Thus, the resources allocated to each VM shall be specifically tailored to be able to execute the processes handled by the VM in due time, while not wasting resources of physical machine, and ensuring that all VMs on a physical machine can run properly.

To do so, scheduler 230 defines, at the creation of each VM, the resources to allocate to this VM, modifies at any time the resources allocated to the VM, or re-allocate a VM to another machine, for example reallocate (260) the VM 244 from the physical machine 221 to the physical machine 222. Scheduler 230 of an embodiment also is responsible for handling and managing VMs in a cluster of computing capabilities which are not physical machines, for example in a cluster of processors or in a cluster of cores of a multi-core processor. Scheduler 230 may be part of a video server configured to perform a plurality of coding of live video channels.

Figure 3:
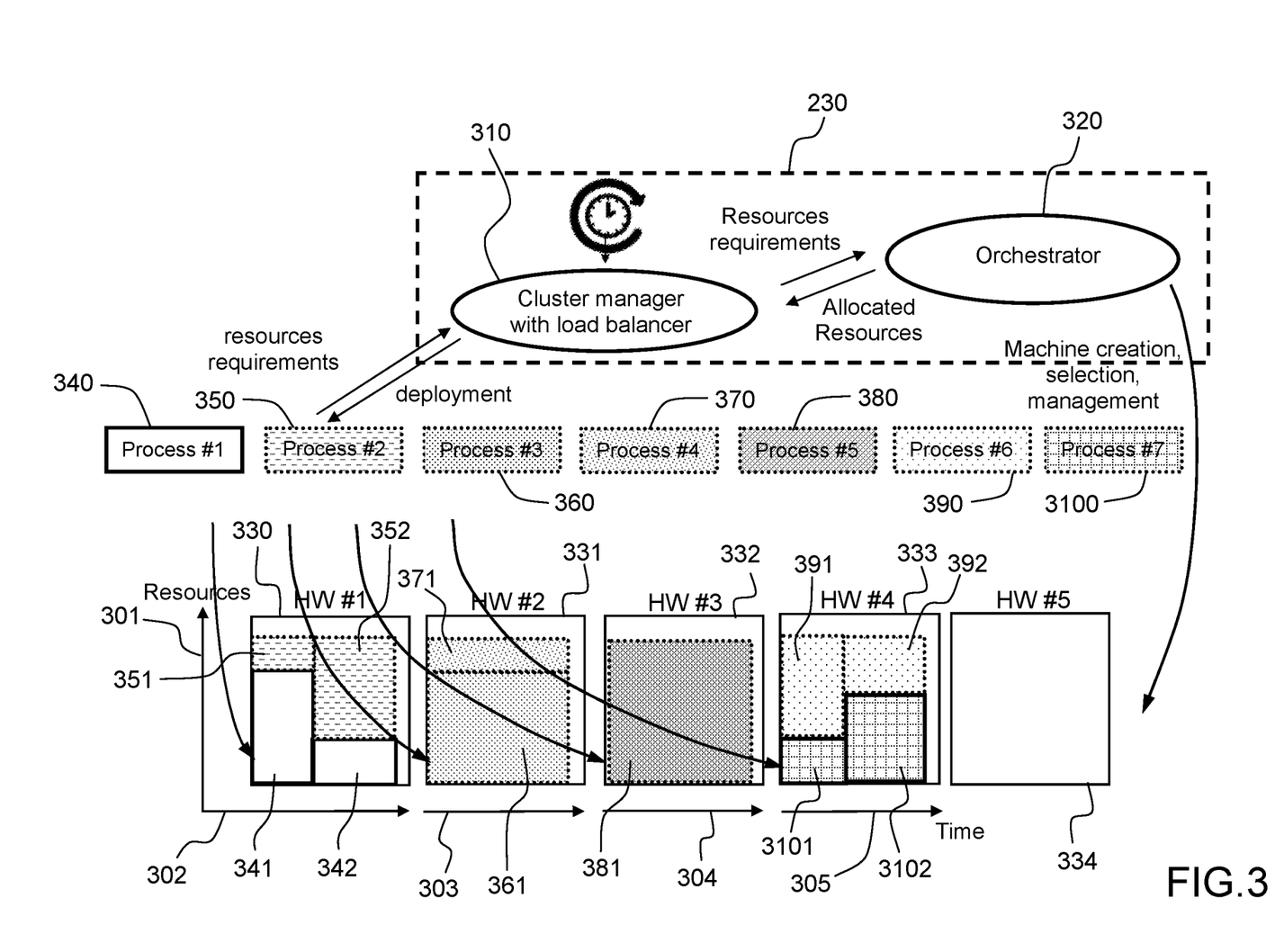
FIG. 3 displays an exemplary architecture of a scheduler of computer processes in accordance with an embodiment of the invention.

FIG. 3 displays an exemplary architecture of a scheduler of computer processes in accordance with an embodiment of the invention. As shown in FIG. 3, scheduler 230 comprises a first processing logic 310 and a second processing logic 320. According to an embodiment, first processing logic 310 and second processing logic 320 may be embedded in, or executing on, two different processing machines, or on a single processing machine configured with two different sets of code instructions.

In the example of FIG. 3, scheduler 230 is configured to dispatch seven processes 340, 350, 360, 370, 380, 390, and 3100 in a cluster of five processing capabilities 330, 331, 332, 333, and 334. To do so, scheduler 230 is configured to create a VM for each computer process, dispatch the VMs over the processing capabilities, and, upon a modification of the computing load of the process, modify the computing capacities of the VMs accordingly.

Vertical axis 301 represents the resources of physical machines. When a VM is allocated on a processing capability, the resources corresponding to the computing capacities of the VM are reserved in the processing capability. The resource and computing capacities represented on vertical axis 301 can be any resource such as CPU, memory, bandwidth, or a combination thereof. More generally, the computing resources and computing capacities can be any computing resource, computing capacity, or combination thereof having an impact on video coding power.

Horizontal axes 302, 303, 304, 305 represents time for each processing capability. Thus, horizontal axes 302, 303, 304, 305 represent the evolution of computing capacities of VMs over time.

First processing logic 310 is configured to obtain predictions, for a period of time, of a computing load of at least one computer process to allocate. In the example of FIG. 3, first processing logic 310 is configured to obtain predictions of computing loads of computer processes 340, 350, 360, 370, 380, 390, and 3100. According to various embodiments of the invention, the computing loads of processes, and the computing capacities of a VM, may be a CPU power, an amount of memory, a bandwidth, or a combination thereof. More generally, the computing capacities may refer to any resource of a VM which has an effect on video coding speed.

According to various embodiments of the invention, many different ways are possible to obtain predictions of computing loads of computer processes. For example, the predictions may be pre-calculated and associated with the computer process. Predictions may also be derived from statistics of previous executions of the processes. It is also possible to calculate the computing load by evaluating the computing load to execute the computer instructions of the computer process.

In a number of embodiments of the invention, computer processes consist of live coding of video programs for live video broadcasting. First processing logic 310 is configured to calculate, for each video program, a target computing capacity of an Operating-System-Level virtual environment to code the video sequence in real time. In an embodiment, processes execute a video coder which is able to adapt coding options in order to be able to deliver video in real time and to obtain the best possible quality according to the computing capacity allocated to the video coder. PCT Patent Application PCT/EP2014/055823, filed Mar. 24, 2014, invented by Marc Amstoutz et al., discloses an example of such a video coder.

In an embodiment, first processing logic 310 is configured to calculate the computing capabilities necessary to code the video sequence in real time based on a prediction of a target video quality index, a target bitrate a video codec, or a combination thereof. Indeed, at an equivalent bitrate, it is more complex to code video at a higher quality. Also, some video codecs are more computationally intensive than others. Possible target indexes of quality may include a PSNR (Peak Signal Noise Ratio), SSIM (Structural SIMilarity), MS-SSIM (Multi-Scale Structural SIMilarity), Delta, MSE (Mean Squared Error), or any other standard or proprietary index. When applicable, such an index may be computed on the video as a whole, or a layer of the video, for example one of the R,G,B layer of the RGB colorspace, one of the Y,U,V layer of a YUV colorspace, or any layer or combination of layers of a type of colorspace. Possible video codecs which may be used include any standard or proprietary video codec, for example the H.264/AVC (Advanced Video Codec), H.265/HEVC (High Efficiency Video Codec), MPEG-2 (Motion Picture Experts Group), VP-8, Vp-9, and VP-10.

For example, first processing logic 310 may be configured to calculate the computing capacities necessary to code the video sequence in real time based on the resolution of the video, the number of frames per second, and the resolution of the video. First processing logic 310 may also take into account one or more complexity parameters such as a level of movement in the sequence, a level of detail of the images in the sequence, and an evaluation of the textures of the sequence. Video sequences depicting fast movements are more difficult to code than quieter ones involving less movement. Video sequences depicting complex textures such as water are more difficult to code than simpler textures. Videos having high levels of detail are more difficult to code than videos with fewer details.

Thus, first processing logic 310 can advantageously tailor the computing capacities of the VMs so that they encode their respective video sequences in real time, according to the number of frames per second, resolution, complexity of the sequence, or according to any other parameter which has an effect on the coding speed of a video sequence.

Embodiments may employ different techniques for determining the computing capacities necessary to execute the video coding successfully in real time. For example, European Patent Application Serial No. 15306385.4, entitled "Method For Determining A Computing Capacity Of One Of A Physical Or A Virtual Machine," filed by the present Applicant on Sep. 11, 2015, discloses approaches for determining a computing capacity of a computing machine, using calibrated computer processes, and approaches for calculating a computing load of a calibrated computed process using a reference computing machine.

In an embodiment, a computing load of a video coding process is calculated by running a plurality of instances of the process on a reference machine having known computing capacity while each of the instances is able to execute successfully, and thus determining the maximum number of instances of the elementary process that can successfully run in parallel on the reference machine. The computing load of the video coding process can then be calculated as the computing capacity of the reference machine divided by the maximum number of instances of the elementary process that can successfully be run in parallel.

In an embodiment, the computing loads of a number of reference video coding processes are calculated, for different durations, resolution, complexities of video, and different target qualities. It is then possible to infer, using both reference computing loads of reference video coding processes, and the characteristics of the video sequence to code, corresponding computing loads of the video coding processes, and to calculate the computing capabilities of the VM accordingly.

In an embodiment, the processes comprise coding a program whose type is known. For example, when a video coding device encodes live TV channels, the video coding device may have access to information about the type of program it is encoding. For example, the video coding device may be informed, at any time, whether the program is a cartoon, an action movie, a weather report, a soccer game, and so on. Some types of video are known to be more difficult to code than other types of video. For example, a cartoon is known to be relatively easy to code than other types of video, while an action movie, typically depicting many explosions and fast movements, is known to be relatively harder to code than other types of video. In an embodiment, first processing logic 310 can be further configured to obtain predictions of computing loads of computing processes to code in real time a video program based on the type of the program, for example obtaining a higher computing load for programs which are harder to code such as action movies, and a lower computing load for programs which are easier to code such as cartoons.

In certain embodiments, processes comprise coding an episode of a program having episodes which have already been broadcast. For example, processes may comprise coding weather reports or episodes of TV shows or TV series. Even though each weather report/episode of TV show or TV series is unique, the type of video data within weather reports, different episodes of the same TV show or the same TV series is similar. Thus, the same goes for the complexity of video coding of these reports and episodes. In such embodiments, first processing logic 310 may calculate the predictions of computing load of the multimedia process based on the computing load of previous encoding or transcoding of this type of program, at predicted target qualities. Due to the similarity between the video data amongst successive episodes of a same type of program, this allows an effective and simple way of calculating the computing load of processes. This is applicable to any program which belongs to a type of program which has already been broadcast, for example, it is applicable to soccer games, weather or news reports, TV shows, or TV series.

First processing logic 310 may be further configured to retrieve predictions of available computing capacities of the processing capabilities for the period of time.

In a number of embodiments, computing capacities are specifically designed to run VMs. Thus, the predictions of available computing capacities of a processing capability over a period of time can be obtained by removing from the computing resources of computing capacity the sum of predictions of computing capacities of VMs running on this processing capability over the period of time.

First processing logic 310 may determine, based on the predictions of the computing load for the period of time of computer processes and the predictions of available computing capacities of the processing capabilities for the period of time, a processing capability on which to allocate the computer processes during the period of time. The objective is to ensure that the process will be able to execute properly on the processing capability during the period of time. To do so, first processing logic 310 may select a processing capability on which to allocate at least one computer process in order that the sum of predictions of computing capabilities of Operating-System-Level virtual environment running on a processing capability never exceeds a computing capacity of the processing capability for the period of time. This ensures that, over the period of time, the process, as well as all the processes and VMs running on the processing capabilities, can be executed correctly.

According to various embodiments, first processing logic 310 is configured to determine the processing capability on which to allocate a process by formulating and solving a multiple knapsack problem. The formulation and solving of the multiple knapsack problem is notably disclosed by Chandra Chekuri and Sanjeev Khanna. 2000. A PTAS for the multiple knapsack problem. In Proceedings of the eleventh annual ACM-SIAM symposium on Discrete algorithms (SODA '00). Society for Industrial and Applied Mathematics, Philadelphia, Pa., USA, 213-222. First processing logic 310 may be configured to formulate a multiple knapsack problem by (a) splitting the period of time in which the process has to be allocated in a processing capability in elementary time windows, (b) creating, for each processing capability, a vector comprising the predictions of available resources of the processing capability for each time window, as a vector of knapsack capacity, and (c) creating, for each process to allocate, a vector comprising predictions of processing loads of the process for each time window as a vector of a knapsack item weight.

A number of different methods are known to solve the multi-dimensional knapsack problem. Such methods are discussed by Pisinger, D. (1995). Algorithms for knapsack problems, Martello, S., & Toth, P. (1987). Algorithms for knapsack problems. Surveys in combinatorial optimization, 31, 213-258, Lawler, E. L. (1979). Fast approximation algorithms for knapsack problems. Mathematics of Operations Research, 4(4), 339-356, or Kellerer, H., Pferschy, U., & Pisinger, D. (2004). Introduction to NP-Completeness of knapsack problems (pp. 483-493). Springer Berlin Heidelber.

In order to allocate all processes on a minimum number of processing capabilities, and thus limit the wasted computing resources to the minimum, it is possible to first formulate and solve the multiple knapsack problem for a number n of processing capabilities (n being equal to the number of processing capabilities where processes are already running, or a predefined number), and, if the number of processing capabilities is not sufficient to allocate the processes, increment n, and proceed to further iterations of formulating and solving the multiple knapsack problem, until being able to allocate all processes. Thus, the processes are allocated on the minimum possible number of processing capabilities, and the computing resources of processing capabilities unused are reduced to the minimum.

Similarly, first processing logic 310 may determine a processing capability as to where to allocate a process by formulating and solving a bin packing problem. The formulation and solve of bin packing problems is known in the prior art and disclosed for example by Martello, S., & Vigo, D. (1998). Exact solution of the two-dimensional finite bin packing problem. Management science, 44(3), 388-399.

Second processing logic 320 is configured to create, modify the VMs, and cause an allocation of the VMs on processing capabilities. Once first processing logic 310 has determined a processing capability where to allocate a process based on predictions of the computing load of the process over a period of time, second processing logic 320 creates a VM having a computing capacity equal to or higher than the prediction of computing load of the process at the start of the period of time, and second processing logic 320 causes an allocation of the VM on the processing capability that was determined by first processing logic 310.

Second processing logic 320 may adapt the computing capacity of the VM over the period of time to match the predictions of computing load of process. For example, second processing logic 320 may increase or lower the computing capacity of the VM to match the increases or decreases of the predictions of computing load of the process over the period of time. Thus, the VM always has a computing capacity high enough to execute the process in real time, for example a computing capacity high enough to code a video stream in real time at a target quality at any time in the period of time.

In the example depicted by FIG. 3, processes 340, 350, 360, 370, 380, 390, and 3100 are processes to transcode in live video channels. Due to prime time periods, most popular programs and the target quality constraints discussed above, the predicted computing loads of the first process 340 are successively a high computing load 341, and a low computing load 342; the predicted computing loads of the second process 350 are successively a low computing load 351, and a high computing load 352; the predicted computing loads of the third process 360 are always high 361; the predicted computing loads of the fourth process 370 are always low 371; the predicted computing loads of the fifth process 380 are always high 381; the predicted computing loads of the sixth process 390 are successively a high computing load 391, and a low computing load 392; the predicted computing loads of the seventh process 3100 are successively a low computing load 3101, and a high computing load 3102. In this example, all processes are dispatched at the same time. According to various embodiments of the invention, scheduler 230 can be configured to iteratively create and allocate the VMs, and determine based on the predictions of computing capacities of the VMs on each processing capability, predictions of available resources of processing capabilities for future allocations of VMs or determine the processing capabilities where to allocate all processes in the same time.

Based on the predictions of computing loads, scheduler 230 successively creates a VM for the first process 340 and allocates it to the first processing capability 330, creates a VM for the second process 350 and allocates it to the first processing capability 330, creates a VM for the third process 360 and allocates it to second first processing capability 331, creates a VM for the fourth process 370 and allocates it to the second processing capability 331, creates a VM for the fifth process 380 and allocates it to the third processing capability 332, creates a VM for the sixth process 390 and allocates it to the fourth processing capability 333, and creates a VM for the seventh process 3100 and allocates it to the fourth processing capability 333.

Upon the modification of the computing capacities of the seven VMs, the computing resources of all processing capabilities are always high enough to allow the VMs to run correctly, and thus, to allow the processes to execute successfully in real time. Meanwhile, the selection of the processing capabilities where to allocate the processes allows a limitation of the waste of computing resources. For example, the allocation of the first process 340 and the second process 350 on the same processing capability allows to reduce the waste of computing resources on the first machine 330 to the minimum. Similarly, the allocation of the sixth process 390 and the seventh process 3100 on the fourth machine 333 allows to reduce the waste of computing resources on the fourth machine 333 to the minimum.

Upon a modification of the predictions of computing load of a process, first processing logic 310 is configured to determine a processing capability as to where the process can be allocated or re-allocated in a manner similar of the initial deployment. In a number of embodiments, the only criteria to re-allocate the process is the minimization of waste of computing resources of the processing capabilities. This is advantageous in cases where the VMs can be transferred from a processing capability to another without issue of interruption of service.

In other embodiments of the invention, it is better, if possible, to keep the VMs running in the same processing capability. This is for example the case for VMs that run a process of live video transcoding for TV broadcast. Indeed, re-allocating such a VM on another processing capability may result in a rupture of video broadcasting service. In such embodiments of the invention, first processing capability 310 may verify if, based on the update predictions of computing load, the process is still able to be executed successfully in the processing capability where it is allocated; if it is, then first processing capability 310 allows the process to proceed in the same processing capability, otherwise, first processing capability may determine a more suitable processing capability where the process may be re-allocated.

In a number of embodiments of the invention, some time slots are more suitable to re-allocate VMs, if needed. For example, in the case of VMs responsible for transcoding video live for broadcast, it is possible to re-allocate the VMs in the middle of the night with limited consequences in case of rupture of service. According to various embodiments of the invention, in case of modification of the predictions of computing load of a process, first processing logic 310 can be configured to plan a re-allocation of the process in a predefined time slot, corresponding to time slots in which ruptures of service have a limited impact. In other embodiments of the invention, first processing logic 310 may plan a complete re-allocation of all the processes running in the cluster of machines in a predefined time slot, corresponding to a time when ruptures of service have a limited impact.

Figure 4A:
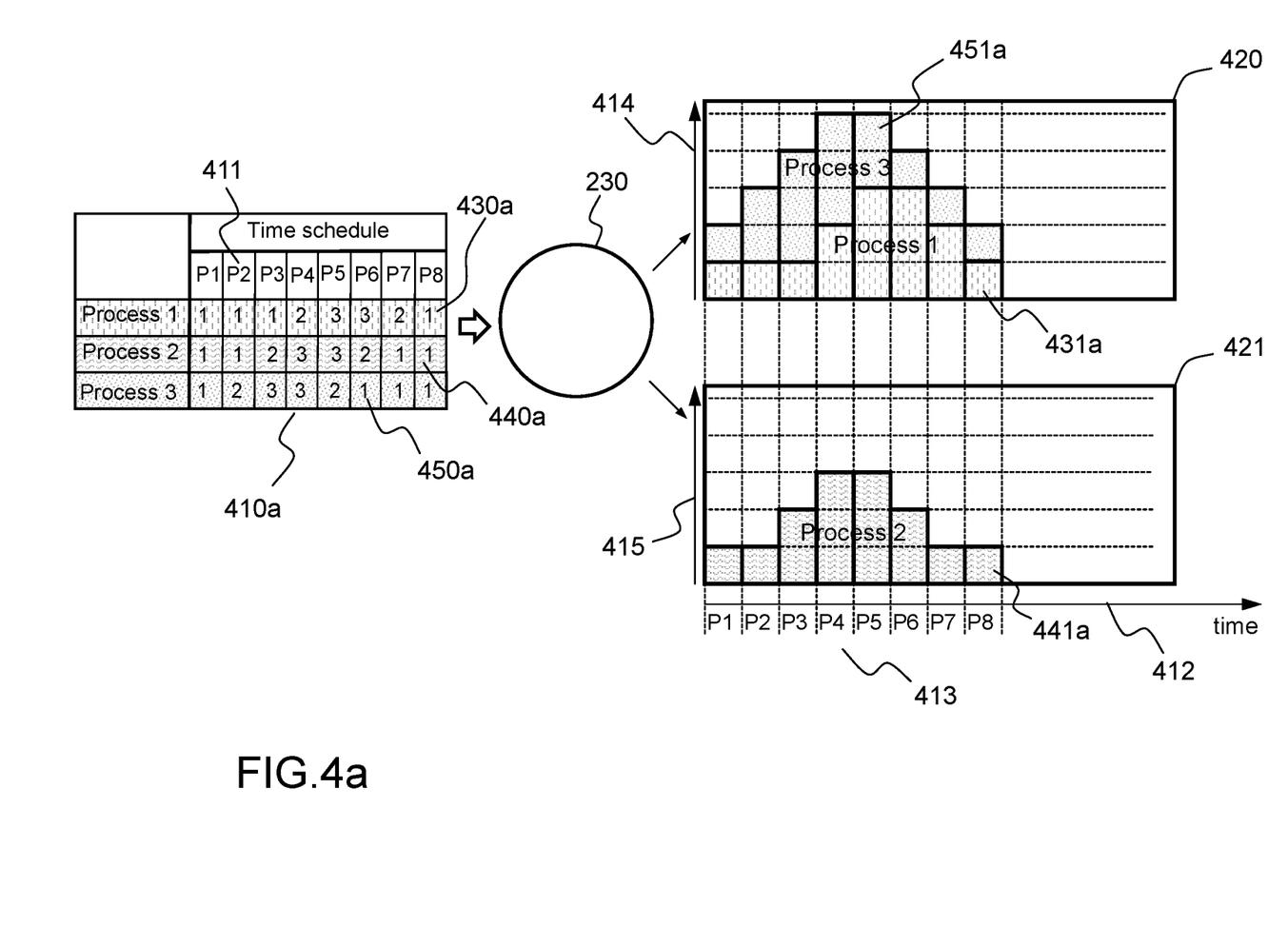
FIGS. 4a, 4b and 4c display respectively three examples of scheduling of computer processes according to embodiments of the invention, respectively for the initial deployment of 3 processes, for the addition of a further computer process, and for the modification of the computing load of an already scheduled process.
Figure 4B:
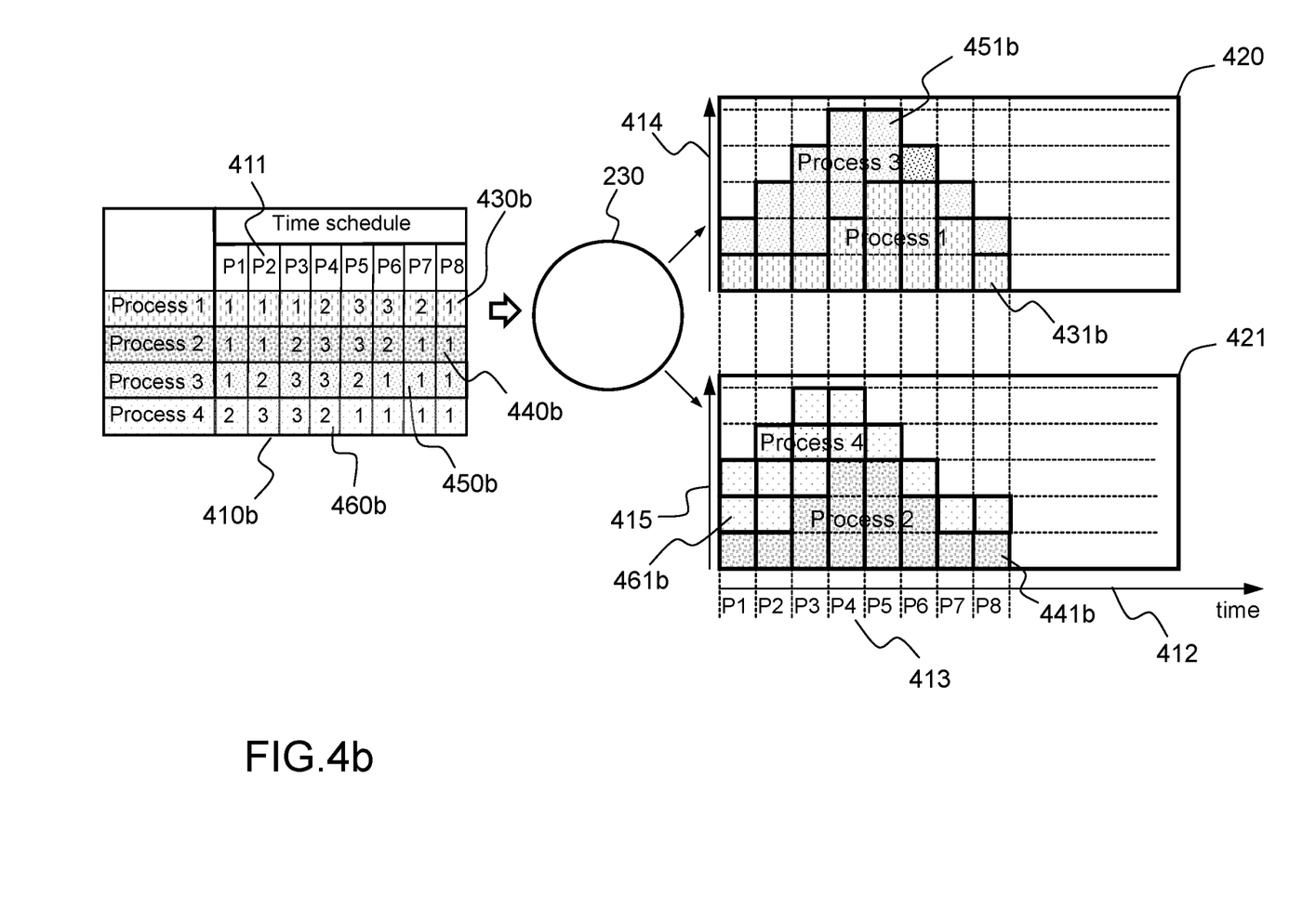
Figure 4C:
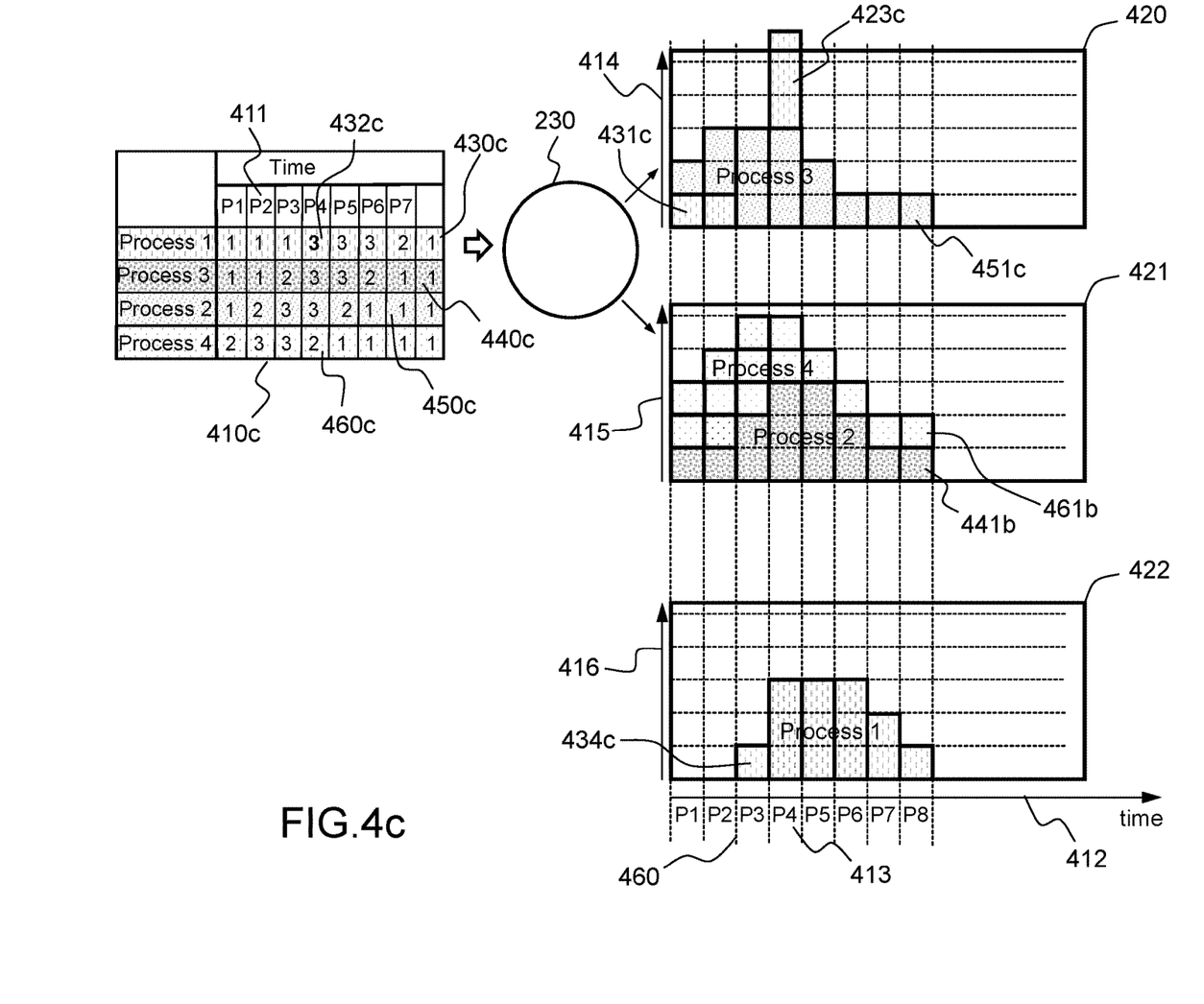

FIGS. 4a, 4b, and 4c display respectively three examples of scheduling of computer processes according to embodiments of the invention, respectively for the initial deployment of 3 processes, for the addition of a further computer process, and for the modification of the computing load of an already scheduled process. FIG. 4a displays an example of scheduling of computer processes according to an embodiment involving an initial deployment of 3 processes.

The predictions of computing load of the three processes are listed in table 410a. They are expressed, for 8 successive time windows 411, in a custom unit, which may represent any amount of computing resources. For example, each unit may represent 100 Mhz of CPU, 200 MB memory, and so on. The predictions of computing load of the first process, for each of the time window, are listed in a first row 430a. The predictions of computing load of the second process, for each of the time window, are listed in a second row 440a. The predictions of computing load of the third process, for each of the time window, are listed in a third row 450a.

Scheduler 230 is configured to allocate the processes on a cluster of at least three computing capabilities: a first computing capability 420, a second computing capability 421 and a third computing capability 422. Each processing capability has an amount of computing resources slightly greater than 5, in the custom unit. Thus, the sum of the computing load of processes running on a single machine cannot exceed 5, at any time window.

Axis 412 represents time, and the separations 413 represent the different time windows. The heights of the rectangles, within the computing capabilities 420, 421, 422 represent the computing capacities allocated to the VMs which execute the processes on each processing capabilities. Axes 414, 415, and 416 represent the computing resources of the processing capabilities 420, 421, and 422 respectively.

In this example, first processing logic 310 is configured to determine the processing capabilities as to where to allocate the processes using a multiple knapsack problem. First processing logic 310 allocates the first and the third processes to the first processing capability 420 and the second process to the second processing capability 421. This is the best possible allocation. Indeed, the second process could not have been allocated to the same machine than the first process, because in the time window P5, the sum of the predictions of the processing loads of the first and the second processes (6) is higher than the processing capabilities of the machines. Similarly, the second process could not have been allocated to the same machine than the third process because in the time window P4, the sum of the predictions of the processing loads of the third and the second processes (6) is higher than the processing capabilities of the machines. On the contrary, in none of the time windows are the sum of the predictions of computing loads of the first and the third processes higher than the computing resources of the processing capabilities. Thus, allocating the first and the third processes to the same processing capability is the only way of allocating the three processes to two processing capabilities and avoiding a waste of processing resources.

Rectangles 431a represent the predictions of computing loads of the first process, in the first machine 420, for each time window. Rectangles 451*a* represent the predictions of computing loads of the third process, in the first machine 420, for each time window. Rectangles 441*a* represent the predictions of computing loads of the second process, in the second machine 421, for each time window.

FIG. 4*b* displays an example of scheduling of computer processes according to an embodiment of the invention involving the addition of a further computer process. The predictions of computing load of the four processes are listed in the table 410*b*. The first row 430*b* of predictions of computing load of the first process, second row 440*b* of predictions of computing load of the second process and third row 450*b* of predictions of computing load of the third process are respectively identical to the first row 430*a*, second row 440*a* and third row 450*a*: the predictions of computing loads of the first, second, and third processes are identical than in FIG. 4*a*. Table 410*b* contains a fourth row 460*b* of predictions of computing load of a fourth process to allocate.

After allocation of the fourth process, rectangles 431*b* represent the predictions of computing loads of the first process, in the first machine 420, for each time window. Rectangles 451*b* represent the predictions of computing loads of the third process, in the first machine 420, for each time window. Rectangles 441*b* represent the predictions of computing loads of the second process, in the second machine 421, for each time window. Rectangles 461*b* represent the predictions of computing loads of the fourth process, in the second machine 421, for each time window.

FIG. 4*c* displays an example of scheduling of computer processes according to an embodiment of the invention involving the modification of the computing load of an already scheduled process. The predictions of computing load of the four processes are listed in table 410*c*. The second row 440*c* of predictions of computing load of the second process, third row 450*c* of predictions of computing load of the third process and fourth row 460*c* of predictions of computing load of the fourth process are respectively identical to the second row 440*b*, third row 450*b* and fourth row 460*b*: the predictions of computing loads of the second, third and fourth processes are identical than in FIG. 4*b*.

On the other hand, the first row 430*c* is modified: the prediction 432*c* of computing load of the first process in the time window P4 is set to 3 instead of 2. Thus, the initial deployment of VMs is no longer relevant: at the time window p4, the sum of the processing loads of the first and the third process is equal to 6. This is represented by the rectangle 423*c* on top of rectangle 451*c*.

First processing logic 310 is, in this example, configured to determine the processing capability as to where to re-allocate the first process using a multiple knapsack problem method. It is not possible to re-allocate the first process in any of the first or the second processing capabilities due to the limitations of processing resources: the first processing re-allocates the first process to the third processing capability 422.

At the time of the modification of predictions of computing load of the first process, the first, second, third and fourth process are already running. As discussed above, the re-allocation of processes may cause issues of ruptures of service. In this example, it is possible to reallocate the processes at the time 460 between time windows P2 and P3 without major prejudice for the quality of service. First processing logic 310 therefore verifies whether it is possible to let the first process run on the first processing logic 420 without spare of processing resources. In this example, the sum of the predictions of computing load of the first and the third process is below 5 in time windows P1 and P2: it is possible to let the first and the third process run on the first processing capability until time 460.

First processing logic 310 then instructs second processing logic 320 to reallocate the first process from the first processing capability 420 to the third processing capability 422 at the time 460. In each time window, all processes are able to execute successfully and the reallocation of the first process and its VM produces, if any, a minor rupture of service.

After prediction of the re-allocation of the first process, rectangles 434*c* represent the predictions of computing loads of the first process, in the first machine 420 before the re-allocation, for each time window. Rectangles 432*c* represent the predictions of computing loads of the first process, in the third machine 422 after the re-allocation, for each time window. Rectangles 451*c* represent the predictions of computing loads of the third process, in the first machine 420, for each time window. Rectangles 441*c* represent the predictions of computing loads of the second process, in the second machine 421, for each time window. Rectangles 461*c* represent the predictions of computing loads of the fourth process, in the second machine 421, for each time window.

These examples demonstrate the ability of scheduler 230 of computer processes of an embodiment of the invention to perform an initial deployment of a plurality of processes, add and modify processes, while ensuring that all processes are able to execute properly and avoid, as soon as it is possible, problematic ruptures of service.

Figure 5:
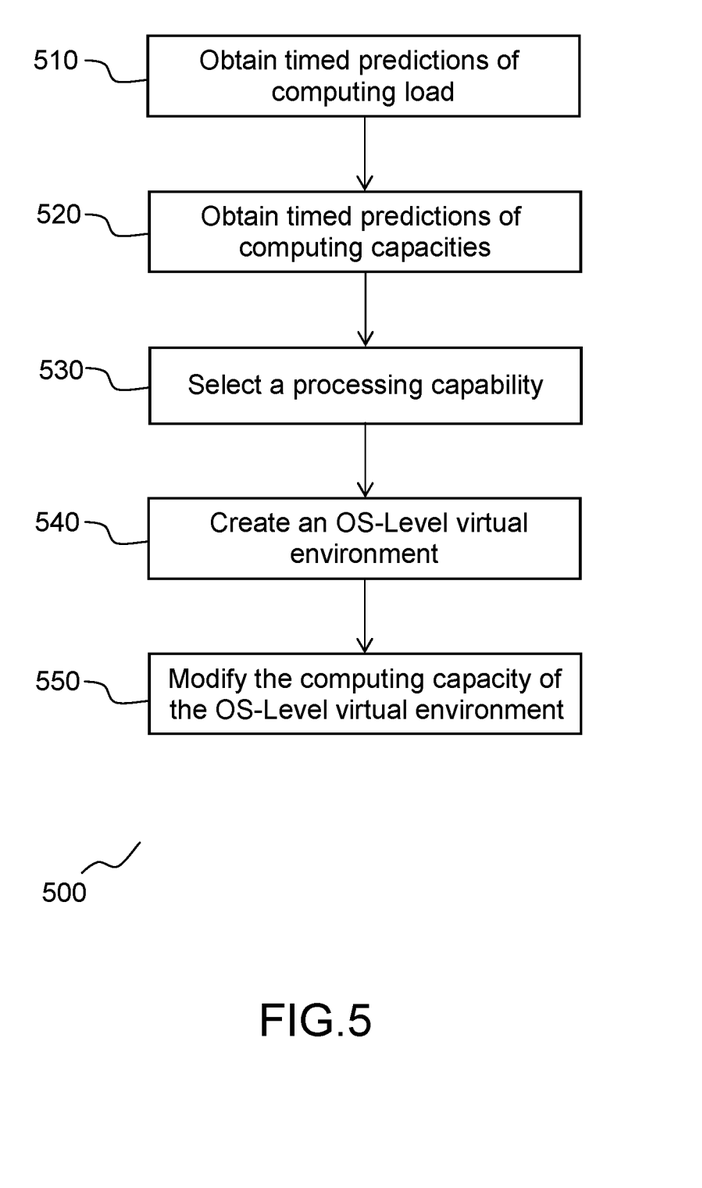
FIG. 5 is a flowchart of scheduling computer processes to be run on a cluster of physical processing capabilities according to embodiments of the invention.

FIG. 5 is a flowchart 500 of scheduling computer processes to be run on a cluster of physical processing capabilities according to embodiments of the invention. Flowchart 500 comprises a step 510 of obtaining predictions of a computing load of at least one computer process to allocate, where the predictions are associated with a period of time. Flowchart 500 further comprises a step 520 of retrieving predictions of available computing capacities of the processing capabilities for the period of time. Flowchart 500 further comprises a step 530 of determining, based on the predictions of the computing load for the period of time of at least one computer process and the predictions of available computing capacities of the processing capabilities for the period of time, a processing capability where to allocate said at least one computer process during the period of time. Flowchart 500 further comprises a step 540 of creating at least one Operating-System-Level virtual environment for at least one computer program, at least one Operating-System-Level virtual environment having a computing capacity equal to or higher than a prediction of the computing load of at least one computer process to allocate at a start of the period of time. Flowchart 500 further comprises a step 550 of adapting the computing capacity of at least one Operating-System-Level virtual environment to the predictions of the computing load of at least one computer process during the period of time. Many different embodiments of flowchart 500 are possible.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims.

Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for a scheduler of computer processes to be executed upon a set of processing capabilities, wherein execution of the one or more sequences of instructions cause:

obtaining predictions of a computing load of at least one multimedia process comprising real time video encoding or transcoding of a video in real time at a video quality over a period of time;

retrieving predictions of available computing capacities of the set of processing capabilities for the period of time, wherein said set of processing capabilities resides in one or more physical machines;

determining, based on the predictions of the computing load for the period of time and the predictions of the available computing capacities for the period of time, a processing capability to allocate said at least one multimedia process during said period of time;

creating at least one Operating-System-Level virtual environment for said at least one multimedia process, said at least one Operating-System-Level virtual environment having a computing capacity equal to or higher than a prediction of the computing load of said at least one multimedia process to allocate at a start of the period of time; and adapting the computing capacity of said at least one Operating-System-Level virtual environment to the predictions of the computing load of said at least one multimedia process during said period of time so that the encoded or transcoded video possesses said video quality throughout said period of time.

2. The non-transitory computer-readable storage medium of claim 1, wherein the video during the period of time belongs to types of programs which have already been broadcasted, and wherein execution of the one or more sequences of instructions further cause:

calculating the predictions of computing load of said multimedia process based on the computing load of previous encoding or transcoding of this type of program at predicted target qualities.

3. The non-transitory computer-readable storage medium of claim 2, wherein calculating the predictions of computing load of said multimedia process based on the computing load of previous encoding or transcoding of this type of program at predicted target qualities comprises:

determining a minimum computing load of previous encoding or transcoding for this type of program at said predicted target qualities.

4. The non-transitory computer-readable storage medium of claim 1, wherein execution of the one or more sequences of instructions further cause:

calculating predictions of the available computing capacities of the processing capabilities for the period of time based on the computing capacities of the processing capabilities and predictions of computing capabilities of Operating-System-Level virtual environments running on the computing capabilities for the period of time.

5. The non-transitory computer-readable storage medium of claim 1, wherein said at least one multimedia process involves real time video encoding or transcoding, and wherein said predictions of the computing load of each of the at least one multimedia process are based at least on predictions of a target index of video quality to deliver in real time.

6. The non-transitory computer-readable storage medium of claim 5, wherein execution of the one or more sequences of instructions further cause:

calculating (a) the predictions of computing load of said multimedia process based on a resolution and a number of frames per second of video, and (b) predictions of target video quality to deliver in real time.

7. The non-transitory computer-readable storage medium of claim 5, wherein execution of the one or more sequences of instructions further cause:

calculating (a) the predictions of computing load of said multimedia process based on a resolution, a number of frames per second, and a type of the video, and (b) predictions of target video quality to deliver in real time.

8. The non-transitory computer-readable storage medium of claim 5, wherein the video during the period of time belongs to types of programs which have already been broadcasted, and wherein execution of the one or more sequences of instructions further cause:

calculating the predictions of the computing load of said multimedia process based on the computing load of previous encoding or transcoding of this type of program at predicted target qualities.

9. The non-transitory computer-readable storage medium of claim 5, wherein said at least one multimedia process executes the video encoding or transcoding process which is able to deliver video in real time while adapting its encoding quality to available computing capacities.

10. The non-transitory computer-readable storage medium of claim 1, wherein the computing load is a CPU load.

11. The non-transitory computer-readable storage medium of claim 1, wherein execution of the one or more sequences of instructions further cause:

selecting the processing capability to allocate said at least one multimedia process in order that a sum of the predictions of a computing capability of the pluralities of capabilities of the Operating-System-Level virtual environment running on the processing capability never exceeds the computing capacity of said processing capability for the period of time.

12. The non-transitory computer-readable storage medium of claim 11, wherein execution of the one or more sequences of instructions further cause:

formulating one of a multiple knapsack problem or a bin packing problem based on the predictions of the computing loads of said at least one multimedia process and the predictions of the computing capabilities of the Operating-System-Level virtual environment running on the processing capabilities;

programmatically solving said one of a multiple knapsack problem or a bin packing problem; and selecting, based on said solution to said one of a multiple knapsack problem or a bin packaging problem, a processing capability on which to allocate said at least one multimedia process.

13. The non-transitory computer-readable storage medium of claim 1, wherein execution of the one or more sequences of instructions further cause:

upon a modification of the predictions of the computing load of said at least one multimedia process for the period of time, verifying whether a sum of predictions of the computing capabilities of the Operating-System-Level virtual environments running on the processing capability exceeds a computing capacity of said processing capability for the period of time; and upon verifying that the sum of predictions does exceed said computing capacity of said processing capability for the period of time, calculating a re-allocation of Operating-System-Level virtual environments on physical machines.

14. The non-transitory computer-readable storage medium of claim 13, wherein execution of the one or more sequences of instructions further cause:

formulating one of a multiple knapsack problem or a bin packing problem based on the predictions of computing loads of said at least one multimedia process and the predictions of computing capabilities of the Operating-System-Level virtual environment running on the processing capabilities;

programmatically solving said one of the multiple knapsack problem or the bin packing problem; and selecting, based on said solution to said one of the multiple knapsack problem or the bin packaging problem, the processing capability on which to reallocate said at least one multimedia process.

15. An apparatus having a scheduler of computer processes to be executed upon a set of processing capabilities, comprising:

one or more processors; and one or more non-transitory computer-readable storage mediums storing one or more sequences of instructions, which when executed, cause:

obtaining predictions of a computing load of at least one multimedia process comprising real time video encoding or transcoding of a video in real time at a video quality over a period of time;

retrieving predictions of available computing capacities of the set of processing capabilities for the period of time, wherein said set of processing capabilities resides in one or more physical machines;

determining, based on the predictions of the computing load for the period of time and the predictions of the available computing capacities for the period of time, a processing capability to allocate said at least one multimedia process during said period of time;

creating at least one Operating-System-Level virtual environment for said at least one multimedia process, said at least one Operating-System-Level virtual environment having a computing capacity equal to or higher than a prediction of the computing load of said at least one multimedia process to allocate at a start of the period of time; and adapting the computing capacity of said at least one Operating-System-Level virtual environment to the predictions of the computing load of said at least one multimedia process during said period of time so that the encoded or transcoded video possesses said video quality throughout said period of time.

16. The apparatus of claim 15, wherein the video during the period of time belongs to types of programs which have already been broadcasted, and wherein execution of the one or more sequences of instructions further cause:

calculating the predictions of computing load of said multimedia process based on the computing load of previous encoding or transcoding of this type of program at predicted target qualities.

17. The apparatus of claim 16, wherein calculating the predictions of computing load of said multimedia process based on the computing load of previous encoding or transcoding of this type of program at predicted target qualities comprises:

determining a minimum computing load of previous encoding or transcoding for this type of program at said predicted target qualities.

18. The apparatus of claim 15, wherein execution of the one or more sequences of instructions further cause:

calculating predictions of available computing capacities of the processing capabilities for the period of time based on computing capacities of the processing capabilities and predictions of computing capabilities of Operating-System-Level virtual environments running on computing capabilities for the period of time.

19. A method for a scheduler of computer processes to be executed upon a set of processing capabilities, comprising:

obtaining predictions of a computing load of at least one multimedia process comprising real time video encoding or transcoding of a video in real time at a video quality over a period of time;

retrieving predictions of available computing capacities of the set of processing capabilities for the period of time, wherein said set of processing capabilities resides in one or more physical machines;

determining, based on the predictions of the computing load for the period of time and the predictions of the available computing capacities for the period of time, a processing capability to allocate said at least one multimedia process during said period of time;

creating at least one Operating-System-Level virtual environment for said at least one multimedia process, said at least one Operating-System-Level virtual environment having a computing capacity equal to or higher than a prediction of the computing load of said at least one multimedia process to allocate at a start of the period of time; and adapting the computing capacity of said at least one Operating-System-Level virtual environment to the predictions of the computing load of said at least one multimedia process during said period of time so that the encoded or transcoded video possesses said video quality throughout said period of time.

20. The apparatus of claim 15, wherein said at least one multimedia process involves real time video encoding or transcoding, and wherein said predictions of the computing load of each of the at least one multimedia process are based at least on predictions of a target index of video quality to deliver in real time.

21. The apparatus of claim 20, wherein execution of the one or more sequences of instructions further cause:

calculating (a) the predictions of computing load of said multimedia process based on a resolution and a number of frames per second of video, and (b) predictions of target video quality to deliver in real time.

22. The apparatus of claim 20, wherein execution of the one or more sequences of instructions further cause:

calculating (a) the predictions of computing load of said multimedia process based on a resolution, a number of frames per second, and a type of the video, and (b) predictions of target video quality to deliver in real time.

23. The apparatus of claim 20, wherein the video during the period of time belongs to types of programs which have already been broadcasted, and wherein execution of the one or more sequences of instructions further cause:

calculating the predictions of the computing load of said multimedia process based on the computing load of previous encoding or transcoding of this type of program at predicted target qualities.

24. The apparatus of claim 20, wherein said at least one multimedia process executes the video encoding or transcoding process which is able to deliver video in real time while adapting its encoding quality to available computing capacities.

25. The apparatus of claim 15, wherein the computing load is a CPU load.

26. The apparatus of claim 15, wherein execution of the one or more sequences of instructions further cause:
   selecting the processing capability to allocate said at least one multimedia process in order that a sum of the predictions of a computing capability of the pluralities of capabilities of the Operating-System-Level virtual environment running on the processing capability never exceeds the computing capacity of said processing capability for the period of time.

27. The apparatus of claim 15, wherein execution of the one or more sequences of instructions further cause:
   formulating one of a multiple knapsack problem or a bin packing problem based on the predictions of the computing loads of said at least one multimedia process and the predictions of the computing capabilities of the Operating-System-Level virtual environment running on the processing capabilities;
   programmatically solving said one of a multiple knapsack problem or a bin packing problem; and
   selecting, based on said solution to said one of a multiple knapsack problem or a bin packaging problem, a processing capability on which to allocate said at least one multimedia process.

28. The apparatus of claim 15, wherein execution of the one or more sequences of instructions further cause:
   upon a modification of the predictions of the computing load of said at least one multimedia process for the period of time, verifying whether a sum of predictions of the computing capabilities of the Operating-System-Level virtual environments running on the processing capability exceeds a computing capacity of said processing capability for the period of time; and
   upon verifying that the sum of predictions does exceed said computing capacity of said processing capability for the period of time, calculating a re-allocation of Operating-System-Level virtual environments on physical machines.

29. The apparatus of claim 28, wherein execution of the one or more sequences of instructions further cause:
   formulating one of a multiple knapsack problem or a bin packing problem based on the predictions of computing loads of said at least one multimedia process and the predictions of computing capabilities of the Operating-System-Level virtual environment running on the processing capabilities;
   programmatically solving said one of the multiple knapsack problem or the bin packing problem; and
   selecting, based on said solution to said one of the multiple knapsack problem or the bin packaging problem, the processing capability on which to reallocate said at least one multimedia process.

30. The method of claim 19, wherein the video during the period of time belongs to types of programs which have already been broadcasted, and wherein the method further comprises:
   calculating the predictions of computing load of said multimedia process based on the computing load of previous encoding or transcoding of this type of program at predicted target qualities.

31. The method of claim 30, wherein calculating the predictions of computing load of said multimedia process based on the computing load of previous encoding or transcoding of this type of program at predicted target qualities comprises:
   determining a minimum computing load of previous encoding or transcoding for this type of program at said predicted target qualities.

32. The method of claim 19, further comprising:
   calculating predictions of the available computing capacities of the processing capabilities for the period of time based on the computing capacities of the processing capabilities and predictions of computing capabilities of Operating-System-Level virtual environments running on the computing capabilities for the period of time.

33. The method of claim 19, wherein said at least one multimedia process involves real time video encoding or transcoding, and wherein said predictions of the computing load of each of the at least one multimedia process are based at least on predictions of a target index of video quality to deliver in real time.

34. The method of claim 33, further comprising:
   calculating (a) the predictions of computing load of said multimedia process based on a resolution and a number of frames per second of video, and (b) predictions of target video quality to deliver in real time.

35. The method of claim 33, further comprising:
   calculating (a) the predictions of computing load of said multimedia process based on a resolution, a number of frames per second, and a type of the video, and (b) predictions of target video quality to deliver in real time.

36. The method of claim 33, wherein the video during the period of time belongs to types of programs which have already been broadcasted, and wherein the method further comprises:
   calculating the predictions of the computing load of said multimedia process based on the computing load of previous encoding or transcoding of this type of program at predicted target qualities.

37. The method of claim 33, wherein said at least one multimedia process executes the video encoding or transcoding process which is able to deliver video in real time while adapting its encoding quality to available computing capacities.

38. The method of claim 19, wherein the computing load is a CPU load.

39. The method of claim 19, further comprising:
   selecting the processing capability to allocate said at least one multimedia process in order that a sum of the predictions of a computing capability of the pluralities of capabilities of the Operating-System-Level virtual environment running on the processing capability never exceeds the computing capacity of said processing capability for the period of time.

40. The method of claim 19, further comprising:
   formulating one of a multiple knapsack problem or a bin packing problem based on the predictions of the computing loads of said at least one multimedia process and the predictions of the computing capabilities of the Operating-System-Level virtual environment running on the processing capabilities;
   programmatically solving said one of a multiple knapsack problem or a bin packing problem; and selecting, based on said solution to said one of a multiple knapsack problem or a bin packaging problem, a processing capability on which to allocate said at least one multimedia process.

41. The method of claim 19, further comprising:

upon a modification of the predictions of the computing load of said at least one multimedia process for the period of time, verifying whether a sum of predictions of the computing capabilities of the Operating-System-Level virtual environments running on the processing capability exceeds a computing capacity of said processing capability for the period of time; and upon verifying that the sum of predictions does exceed said computing capacity of said processing capability for the period of time, calculating a re-allocation of Operating-System-Level virtual environments on physical machines.

42. The method of claim 41, further comprising:

formulating one of a multiple knapsack problem or a bin packing problem based on the predictions of computing loads of said at least one multimedia process and the predictions of computing capabilities of the Operating-System-Level virtual environment running on the processing capabilities;

programmatically solving said one of the multiple knapsack problem or the bin packing problem; and selecting, based on said solution to said one of the multiple knapsack problem or the bin packaging problem, the processing capability on which to reallocate said at least one multimedia process.

* * * * *